(12) United States Patent
Tsirogiannis et al.

(10) Patent No.: US 12,314,258 B2
(45) Date of Patent: May 27, 2025

(54) RUNTIME JOIN PRUNING TO IMPROVE JOIN PERFORMANCE FOR TABLES

(71) Applicant: Snowflake Inc., Bozeman, MT (US)

(72) Inventors: Dimitrios Tsirogiannis, Belmont, CA (US); Zhaohui Zhang, Redwood City, CA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 18/649,509

(22) Filed: Apr. 29, 2024

(65) Prior Publication Data

US 2025/0036620 A1    Jan. 30, 2025

Related U.S. Application Data

(63) Continuation of application No. 18/358,402, filed on Jul. 25, 2023, now Pat. No. 11,995,080.

(51) Int. Cl.
*G06F 16/2453* (2019.01)

(52) U.S. Cl.
CPC .. *G06F 16/24537* (2019.01); *G06F 16/24542* (2019.01); *G06F 16/24549* (2019.01)

(58) Field of Classification Search
None
See application file for complete search history.

(56) References Cited

U.S. PATENT DOCUMENTS

| | | | |
|---|---|---|---|
| 11,403,294 B1 * | 8/2022 | Aya | G06F 16/2255 |
| 2016/0196306 A1 | 7/2016 | Beavin et al. | |
| 2017/0031976 A1 | 2/2017 | Chavan et al. | |
| 2017/0031978 A1 * | 2/2017 | Cunico | G06F 16/9535 |
| 2018/0089261 A1 * | 3/2018 | Li | G06F 16/2453 |
| 2021/0089535 A1 | 3/2021 | Chen et al. | |
| 2021/0397619 A1 | 12/2021 | Heimel et al. | |
| 2023/0141462 A1 | 5/2023 | Wolf et al. | |

OTHER PUBLICATIONS

"U.S. Appl. No. 18/358,402, Non Final Office Action mailed Oct. 5, 2023", 12 pgs.
"U.S. Appl. No. 18/358,402, Notice of Allowance mailed Jan. 25, 2024", 8 pgs.
"U.S. Appl. No. 18/358,402, Response filed Jan. 5, 2024 to Non Final Office Action mailed Oct. 5, 2023", 10 pgs.

* cited by examiner

*Primary Examiner* — Christopher J Raab
(74) *Attorney, Agent, or Firm* — Schwegman Lundberg & Woessner, P.A.

(57) ABSTRACT

The subject technology receives a query, the query including a statement for performing a join operation on a first table and a second table. The subject technology executes, by an execution node using a generated query plan, the query. The subject technology performs, during execution of the query by the execution node, a runtime range pruning process. The subject technology determines a set of range sets for pruning, each range set including a set of columns from the first table, the set of columns being removed from undergoing a read operation as part of executing the query. The subject technology determines, based on a range bloom vector, a set of rows in a particular range set of the first table to avoid scanning in connection with the read operation. The subject technology performs the read operation based a remaining set of rows.

20 Claims, 12 Drawing Sheets

FIG. 5 hybrid table runtime range pruning

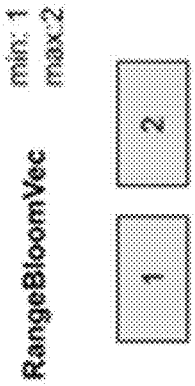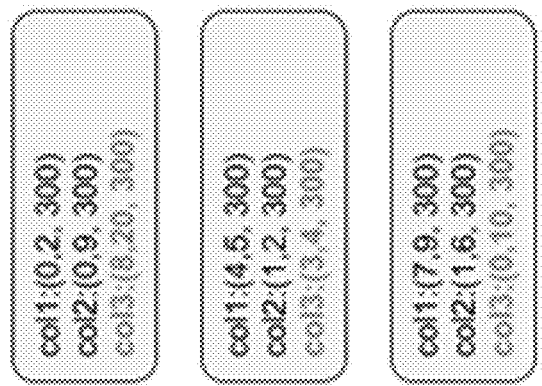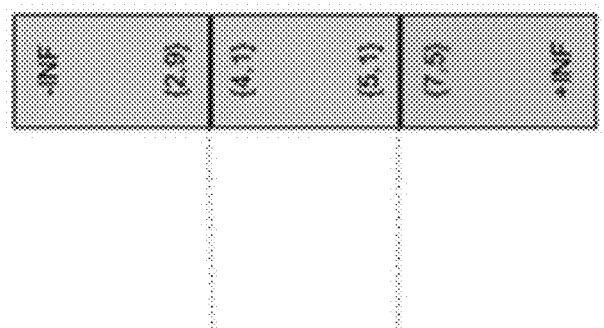
EP and prune info for the join query
FIG. 6

RUNTIME JOIN PRUNING TO IMPROVE JOIN PERFORMANCE FOR TABLES

CROSS-REFERENCE TO RELATED APPLICATIONS

This application is a continuation of U.S. patent application Ser. No. 18/358,402, filed on Jul. 25, 2023, entitled "RUNTIME JOIN PRUNING TO IMPROVE JOIN PERFORMANCE FOR DATABASE TABLES," and the contents of which are incorporated herein by reference in their entirety for all purposes.

TECHNICAL FIELD

Embodiments of the disclosure relate generally to databases and, more specifically, to resource management related to performing tasks in conjunction with such databases.

BACKGROUND

Databases are an organized collection of data that enable data to be easily accessed, manipulated, and updated. Databases serve as a method of storing, managing, and retrieving information in an efficient manner. Traditional database management requires companies to provision infrastructure and resources to manage the database in a data center. Management of a traditional database can be very costly and requires oversight by multiple persons having a wide range of technical skill sets.

Databases are widely used for data storage and access in computing applications. A goal of database storage is to provide enormous sums of information in an organized manner so that it can be accessed, managed, and updated.

Traditional relational database management systems (RDMS) require extensive computing and storage resources and have limited scalability. Large sums of data may be stored across multiple computing devices. A server may manage the data such that it is accessible to customers with on-premises operations. For an entity that wishes to have an in-house database server, the entity must expend significant resources on a capital investment in hardware and infrastructure for the database, along with significant physical space for storing the database infrastructure. Further, the database may be highly susceptible to data loss during a power outage or other disaster situations. Such traditional database systems have significant drawbacks that may be alleviated by a cloud-based database system.

A cloud database system may be deployed and delivered through a cloud platform that allows organizations and end users to store, manage, and retrieve data from the cloud. Some cloud database systems include a traditional database architecture that is implemented through the installation of database software on top of a computing cloud. The database may be accessed through a Web browser or an application programming interface (API) for application and service integration. Some cloud database systems are operated by a vendor that directly manages backend processes of database installation, deployment, and resource assignment tasks on behalf of a client. The client may have multiple end users that access the database by way of a Web browser and/or API. Cloud databases may provide significant benefits to some clients by mitigating the risk of losing database data and allowing the data to be accessed by multiple users across multiple geographic regions.

When certain information is to be extracted from a database, a query statement may be executed against the database data. A network-based database system processes the query and returns certain data according to one or more query predicates that indicate what information should be returned by the query. The database system extracts specific data from the database and formats that data into a readable form.

Queries can be executed against database data to find certain data within the database. A database query extracts data from the database and formats it into a readable form. For example, when a user wants data from a database, the user may write a query in a query language supported by the database. The query may request specific information from the database. The query may request any pertinent information that is stored within the database. If the appropriate data can be found to respond to the query, the database has the potential to reveal complex trends and activities.

BRIEF DESCRIPTION OF THE DRAWINGS

The present disclosure will be understood more fully from the detailed description given below and from the accompanying drawings of various embodiments of the disclosure.

FIG. 6 is a diagram depicting an example of runtime read version pruning, in accordance with some embodiments of the present disclosure.

DETAILED DESCRIPTION

Figure 1:
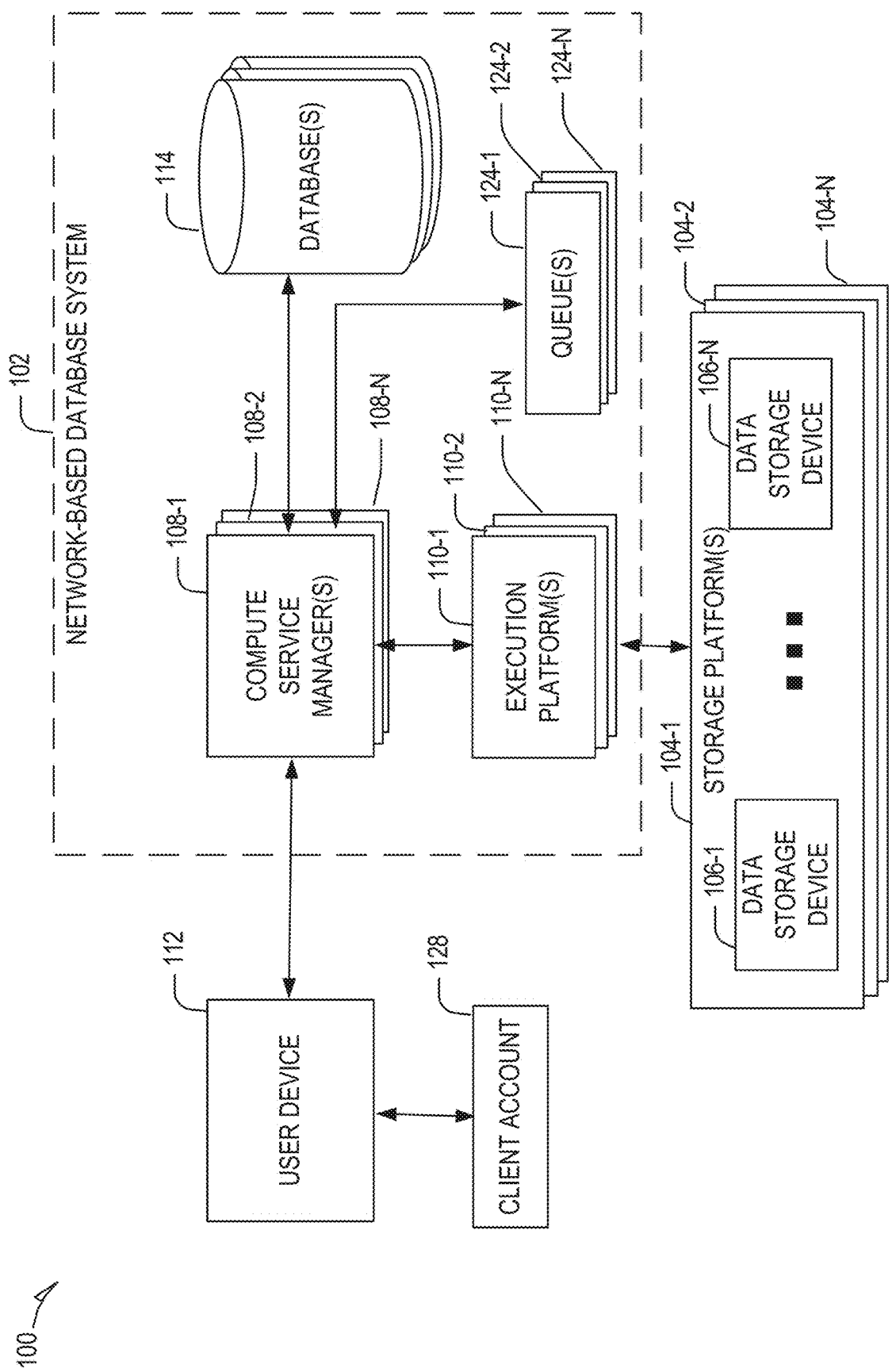
FIG. 1 illustrates an example computing environment that includes a network-based database system in communication with a storage platform, in accordance with some embodiments of the present disclosure.

Reference will now be made in detail to specific example embodiments for carrying out the inventive subject matter.

Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

Databases are used by various entities and companies for storing information that may need to be accessed or analyzed. In an example, a retail company may store a listing of all sales transactions in a database. The database may include information about when a transaction occurred, where it occurred, a total cost of the transaction, an identifier and/or description of all items that were purchased in the transaction, and so forth. The same retail company may also store, for example, employee information in that same database that might include employee names, employee contact information, employee work history, employee pay rate, and so forth. Depending on the needs of this retail company, the employee information and transactional information may be stored in different tables of the same database. The retail company may have a need to "query" its database when it wants to learn information that is stored in the database. This retail company may want to find data about, for example, the names of all employees working at a certain store, all employees working on a certain date, all transactions for a certain product made during a certain time frame, and so forth.

When the retail store wants to query its database to extract certain organized information from the database, a query statement is executed against the database data. The query returns certain data according to one or more query predicates that indicate what information should be returned by the query. The query extracts specific data from the database and formats that data into a readable form. The query may be written in a language that is understood by the database, such as Structured Query Language ("SQL"), so the database systems can determine what data should be located and how it should be returned. The query may request any pertinent information that is stored within the database. If the appropriate data can be found to respond to the query, the database has the potential to reveal complex trends and activities. This power can only be harnessed through the use of a successfully executed query.

The systems, methods, and devices described herein provide embodiments for scheduling and executing tasks on shared storage and execution platforms. The systems, methods, and devices described herein may be implemented on network-based database platforms. Further, the implementations described herein enable queries to be executed on behalf of a client account.

FIG. 1 illustrates an example computing environment 100 that includes a network-based database system 102 in communication with a storage platform 104-1, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein.

In some embodiments, the network-based database system 102 includes compute service manager 108-1 to compute service manager 108-N, each of which can be in communication with one or more of queue 124-1 to queue 124-N, a client account 128, database(s) 114, and execution platform 110-1 to execution platform 110-N. In embodiments, each execution platform can correspond to a given (or different) cloud service provider (e.g., AWS®, Google Cloud Platform®, Microsoft Azure®, and the like).

In an embodiment, a compute service manager (e.g., any of the compute service managers shown in FIG. 1) does not receive any direct communications from a client account 128 and only receives communications concerning jobs from the queue. In particular implementations, a compute service manager can support any number of client accounts 128 such as end users corresponding to respective one or more of user device 112 that provide data storage and retrieval requests, system administrators managing the systems and methods described herein, and other components/devices that interact with the compute service manager. As used herein, a compute service manager may also be referred to as a "global services system" that performs various functions as discussed herein, and each of compute service manager 108-1 to compute service manager 108-N can correspond to a particular cluster (or clusters) of computing resources as described further herein.

Thus it is appreciated that embodiments of the subject technology can provide multiple instances of the aforementioned components, where each instance of a compute service manager can also utilize different instances of an execution platform, database, or queue. In particular, it is appreciated that the network-based database system 102 provides different instances of components to enable different versions of databases or execution platforms to be utilized by a given compute service manager, ensuring further flexibility to perform operations in connection with executing queries (e.g., received from client account 128 associated with user device 112). For example, a particular query can be compatible with a particular version of a database or execution platform, and it can be imperative that a given compute service manager facilitate execution of such a query to that particular of the database or execution platform as provided by the network-based database system 102.

As shown, the computing environment 100 comprises the network-based database system 102 and a storage platform 104 (e.g., AWS®, Microsoft Azure Blob Storage®, or Google Cloud Storage®). The network-based database system 102 is used for accessing and/or processing integrated data from one or more disparate sources including data storage devices 106-1 to 106-N within the storage platform 104. The storage platform 104 comprises a plurality of computing machines and provides on-demand computer system resources such as data storage and computing power to the network-based database system 102.

The network-based database system 102 includes one or more compute service managers, execution platforms, and databases. The network-based database system 102 hosts and provides database services to multiple client accounts. Administrative users can create and manage identities (e.g., users, roles, and groups) and use permissions to allow or deny access to the identities to resources and services.

Each compute service manager (e.g., any of the compute service managers shown in FIG. 1) coordinates and manages operations of the network-based database system 102. The compute service manager also performs query optimization and compilation as well as managing clusters of computing services that provide compute resources (also referred to as "virtual warehouses"). The compute service manager can support any number of client accounts such as end users providing data storage and retrieval requests, system administrators managing the systems and methods described herein, and other components/devices that interact with compute service manager 108-1.

The compute service manager (e.g., any of the compute service managers shown in FIG. 1) is also in communication with a user device 112. The user device 112 corresponds to a user of one of the multiple client accounts supported by the network-based database system 102. As shown, the user is associated with a client account 128. In some embodiments, the compute service manager 108-1 does not receive any direct communications from the user device 112 and only receives communications concerning jobs from a queue 124-1 within the network-based database system 102.

The compute service manager is also coupled to one or more database 114, which is associated with the data stored in the computing environment 100. The database 114 stores data pertaining to various functions and aspects associated with the network-based database system 102 and its users. In some embodiments, the database 114 includes a summary of data stored in remote data storage systems as well as data available from a local cache. Additionally, the database 114 may include information regarding how data is organized in remote data storage systems (e.g., the storage platform 104) and the local caches. The database 114 allows systems and services to determine whether a piece of data needs to be accessed without loading or accessing the actual data from a storage device.

In embodiments, the compute service manager is also coupled to one or more metadata databases that store metadata pertaining to various functions and aspects associated with the network-based database system 102 and its users. In an embodiment, a data structure can be utilized for storage of database metadata in the metadata database. For example, such a data structure may be generated from metadata micro-partitions and may be stored in a metadata cache memory. The data structure includes table metadata pertaining to database data stored across a table of the database. The table may include multiple micro-partitions serving as immutable storage devices that cannot be updated in-place. Each of the multiple micro-partitions can include numerous rows and columns making up cells of database data. The table metadata may include a table identification and versioning information indicating, for example, how many versions of the table have been generated over a time period, which version of the table includes the most up-to-date information, how the table was changed over time, and so forth. A new table version may be generated each time a transaction is executed on the table, where the transaction may include a DML statement such as an insert, delete, merge, and/or update command. Each time a DML statement is executed on the table, and a new table version is generated, one or more new micro-partitions may be generated that reflect the DML statement.

In an embodiment, the aforementioned table metadata includes global information about the table of a specific version. The aforementioned data structure further includes file metadata that includes metadata about a micro-partition of the table. The terms "file" and "micro-partition" may each refer to a subset of database data and may be used interchangeably in some embodiments. The file metadata includes information about a micro-partition of the table. Further, metadata may be stored for each column of each micro-partition of the table. The metadata pertaining to a column of a micro-partition may be referred to as an expression property (EP) and may include any suitable information about the column, including for example, a minimum and maximum for the data stored in the column, a type of data stored in the column, a subject of the data stored in the column, versioning information for the data stored in the column, file statistics for all micro-partitions in the table, global cumulative expressions for columns of the table, and so forth. Each column of each micro-partition of the table may include one or more expression properties. It should be appreciated that the table may include any number of micro-partitions, and each micro-partition may include any number of columns. The micro-partitions may have the same or different columns and may have different types of columns storing different information. As discussed further herein, the subject technology provides a file system that includes "EP" files (expression property files), where each of the EP files stores a collection of expression properties about corresponding data. As described further herein, each EP file (or the EP files, collectively) can function similar to an indexing structure for micro-partition metadata. Stated another way, each EP file contains a "region" of micro-partitions, and the EP files are the basis for persistence, cache organization and organizing the multi-level structures of a given table's EP metadata. Additionally, in some implementations of the subject technology, a two-level data structure (also referred to as "2-level EP" or a "2-level EP file") can at least store metadata corresponding to grouping expression properties and micro-partition statistics.

As mentioned above, a table of a database may include many rows and columns of data. One table may include millions of rows of data and may be very large and difficult to store or read. A very large table may be divided into multiple smaller files corresponding to micro-partitions. For example, one table may be divided into six distinct micro-partitions, and each of the six micro-partitions may include a portion of the data in the table. Dividing the table data into multiple micro-partitions helps to organize the data and to find where certain data is located within the table.

In an embodiment, all data in tables is automatically divided into an immutable storage device referred to as a micro-partition. The micro-partition may be considered a batch unit where each micro-partition has contiguous units of storage. By way of example, each micro-partition may contain between 50 MB and 500 MB of uncompressed data (note that the actual size in storage may be smaller because data may be stored compressed).

Groups of rows in tables may be mapped into individual micro-partitions organized in a columnar fashion. This size and structure allow for extremely granular selection of the micro-partitions to be scanned, which can be composed of millions, or even hundreds of millions, of micro-partitions. This granular selection process may be referred to herein as "pruning" based on metadata as described further herein.

In an example, pruning involves using metadata to determine which portions of a table, including which micro-partitions or micro-partition groupings in the table, are not pertinent to a query, and then avoiding those non-pertinent micro-partitions (e.g., files) and micro-partition groupings (e.g., regions) when responding to the query and scanning only the pertinent micro-partitions to respond to the query. Metadata may be automatically gathered about all rows stored in a micro-partition, including: the range of values for each of the columns in the micro-partition; the number of distinct values; and/or additional properties used for both optimization and efficient query processing. In one embodiment, micro-partitioning may be automatically performed on all tables. For example, tables may be transparently partitioned using the ordering that occurs when the data is inserted/loaded.

The micro-partitions as described herein can provide considerable benefits for managing database data, finding database data, and organizing database data. Each micro-partition organizes database data into rows and columns and stores a portion of the data associated with a table. One table may have many micro-partitions. The partitioning of the database data among the many micro-partitions may be done in any manner that makes sense for that type of data.

A query may be executed on a database table to find certain information within the table. To respond to the query, a compute service manager scans the table to find the information requested by the query. The table may include millions and millions of rows, and it would be very time consuming and it would require significant computing resources for the compute service manager to scan the entire table. The micro-partition organization along with the systems, methods, and devices for database metadata storage of the subject technology provide significant benefits by at least shortening the query response time and reducing the amount of computing resources that are required for responding to the query.

The compute service manager may find the cells of database data by scanning database metadata. The multiple level database metadata of the subject technology enables the compute service manager to quickly and efficiently find the correct data to respond to the query. The compute service manager may find the correct table by scanning table metadata across all the multiple tables in a given database. The compute service manager may find a correct grouping of micro-partitions by scanning multiple grouping expression properties across the identified table. Such grouping expression properties include information about database data stored in each of the micro-partitions within the grouping.

The compute service manager may find a correct micro-partition by scanning multiple micro-partition expression properties within the identified grouping of micro-partitions. The compute service manager may find a correct column by scanning one or more column expression properties within the identified micro-partition. The compute service manager may find the correct row(s) by scanning the identified column within the identified micro-partition. The compute service manager may scan the grouping expression properties to find groupings that have data based on the query. The compute service manager reads the micro-partition expression properties for that grouping to find one or more individual micro-partitions based on the query. The compute service manager reads column expression properties within each of the identified individual micro-partitions. The compute service manager scans the identified columns to find the applicable rows based on the query.

In an embodiment, an expression property is information about the one or more columns stored within one or more micro-partitions. For example, multiple expression properties are stored that each pertain to a single column of a single micro-partition. In an alternative embodiment, one or more expression properties are stored that pertain to multiple columns and/or multiple micro-partitions and/or multiple tables. The expression property is any suitable information about the database data and/or the database itself. In an embodiment, the expression property includes one or more of: a summary of database data stored in a column, a type of database data stored in a column, a minimum and maximum for database data stored in a column, a null count for database data stored in a column, a distinct count for database data stored in a column, a structural or architectural indication of how data is stored, and the like. It is appreciated that a given expression property is not limited to a single column, and can also be applied to a predicate. In addition, an expression property can be derived from a base expression property of all involving columns.

In an embodiment, the metadata organization structures of the subject technology may be applied to database "pruning" based on the metadata as described further herein. The metadata organization may lead to extremely granular selection of pertinent micro-partitions of a table. Pruning based on metadata is executed to determine which portions of a table of a database include data that is relevant to a query. Pruning is used to determine which micro-partitions or groupings of micro-partitions are relevant to the query, and then scanning only those relevant micro-partitions and avoiding all other non-relevant micro-partitions. By pruning the table based on the metadata, the subject system can save significant time and resources by avoiding all non-relevant micro-partitions when responding to the query. After pruning, the system scans the relevant micro-partitions based on the query.

In an embodiment, the metadata database includes EP files (expression property files), where each of the EP files store a collection of expression properties about corresponding data. As mentioned before, EP files provide a similar function to an indexing structure into micro-partition metadata. Metadata may be stored for each column of each micro-partition of a given table. In an embodiment, the aforementioned EP files can be stored in a cache provided by the subject system for such EP files (e.g., "EP cache").

In some embodiments, the compute service manager may determine that a job should be performed based on data from the database 114. In such embodiments, the compute service manager may scan the data and determine that a job should be performed to improve data organization or database performance. For example, the compute service manager may determine that a new version of a source table has been generated and the pruning index has not been refreshed to reflect the new version of the source table. The database 114 may include a transactional change tracking stream indicating when the new version of the source table was generated and when the pruning index was last refreshed. Based on that transaction stream, the compute service manager may determine that a job should be performed. In some embodiments, the compute service manager determines that a job should be performed based on a trigger event and stores the job in a queue until the compute service manager is ready to schedule and manage the execution of the job. In an embodiment of the disclosure, the compute service manager determines whether a table or pruning index needs to be reclustered based on one or more DML commands being performed, wherein one or more of DML commands constitute the trigger event.

The compute service manager may receive rules or parameters from the client account 128 and such rules or parameters may guide the compute service manager in scheduling and managing internal jobs. The client account 128 may indicate that internal jobs should only be executed at certain times or should only utilize a set maximum amount of processing resources. The client account 128 may further indicate one or more trigger events that should prompt the compute service manager to determine that a job should be performed. The client account 128 may provide parameters concerning how many times a task may be re-executed and/or when the task should be re-executed.

The compute service manager is in communication with one or more queue 124-1. In an embodiment, the compute service manager does not receive any direct communications from a client account 128 and only receives communications concerning jobs from the queue 124-1. In particular implementations, the compute service manager can support any number of client accounts 128 such as end users providing data storage and retrieval requests, system administrators managing the systems and methods described herein, and other components/devices that interact with compute service manager.

The queue 124-1 may provide a job to the compute service manager. One or more jobs may be stored in the queue 124-1 in an order of receipt and/or an order of priority, and each of those one or more jobs may be communicated to the compute service manager to be scheduled and executed.

In an implementation, the queue 124-1 may determine a job to be performed based on a trigger event such as the ingestion of data, deleting one or more rows in a table, updating one or more rows in a table, a materialized view becoming stale with respect to its source table, a table reaching a predefined clustering threshold indicating the table should be reclustered, and so forth.

The queue 124-1 may determine internal jobs that should be performed to improve the performance of the database and/or to improve the organization of database data. In an embodiment, the queue 124-1 does not store queries to be executed for a client account but instead only stores database jobs that improve database performance.

A compute service manager is further coupled to an execution platform (e.g., one of execution platform 110-1, execution platform 110-2, execution platform 110-N), which provides multiple computing resources that execute various data storage and data retrieval tasks. The execution platform is coupled to one of a storage platform (e.g., storage platform 104-1, storage platform 104-2, storage platform 104-N). The storage platform 104-1 comprises multiple data storage devices 106-1 to 106-N, and each other storage platform can also include multiple data storage devices. In some embodiments, the data storage devices 106-1 to 106-N are cloud-based storage devices located in one or more geographic locations. For example, the data storage devices 106-1 to 106-N may be part of a public cloud infrastructure or a private cloud infrastructure. The data storage devices 106-1 to 106-N may be hard disk drives (HDDs), solid state drives (SSDs), storage clusters, AMAZON S3 storage systems or any other data storage technology. Additionally, the storage platform 104 may include distributed file systems (such as Hadoop Distributed File Systems (HDFS)), object storage systems, and the like. Similarly, any of the data storage devices in other storage platforms can also have similar characteristics described above in connection with storage platform 104-1.

The execution platform (e.g., any of the execution platforms shown in FIG. 1) comprises a plurality of compute nodes. A set of processes on a compute node executes a query plan compiled by the compute service manager. The set of processes can include: a first process to execute the query plan; a second process to monitor and delete micropartition files using a least recently used (LRU) policy and implement an out of memory (OOM) error mitigation process; a third process that extracts health information from process logs and status to send back to the compute service manager 108-1; a fourth process to establish communication with the compute service manager 108-1 after a system boot; and a fifth process to handle all communication with a compute cluster for a given job provided by the compute service manager 108-1 and to communicate information back to the compute service manager 108-1 and other compute nodes of the execution platform.

A relational join is a data processing operation in a relational data management system. For example, a join is a binary operator, taking two relations R and S, and a binary predicate θ as inputs, and producing a single relation which contains the set of all combinations of tuples in R and S which satisfy the predicate θ.

In an example, a single query can performs multiple join operations (among other types of operations), and a tree-shaped (or tree structure) execution plan (e.g., a query plan) can be generated to represent the query where such a query plan includes a set of nodes corresponding to various operations that are performed during query execution. For illustration, join operations can form intermediate nodes and group nodes of the tree structure representing the query plan, while base relations form analogous leaves of that tree structure of the query plan. Data flows from the leaves of the tree structure towards the root, where the final query result is produced.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

As shown in FIG. 1, the data storage devices 106-1 to 106-N are decoupled from the computing resources associated with the execution platform 110-1. This architecture supports dynamic changes to the network-based database system 102 based on the changing data storage/retrieval needs as well as the changing needs of the users and systems. The support of dynamic changes allows the network-based database system 102 to scale quickly in response to changing demands on the systems and components within the network-based database system 102. The decoupling of the computing resources from the data storage devices supports the storage of large amounts of data without requiring a corresponding large amount of computing resources. Similarly, this decoupling of resources supports a significant increase in the computing resources utilized at a particular time without requiring a corresponding increase in the available data storage resources.

Each of compute service manager, database, execution platform, and storage platform shown in FIG. 1 may be implemented as a distributed system (e.g., distributed across multiple systems/platforms at multiple geographic locations). Additionally, each of the compute service manager, database, execution platform, and storage platform can be scaled up or down (independently of one another) depending on changes to the requests received and the changing needs of the network-based database system 102. Thus, in the described embodiments, the network-based database system 102 is dynamic and supports regular changes to meet the current data processing needs.

During typical operation, the network-based database system 102 processes multiple jobs determined by a compute service manager. These jobs are scheduled and managed by the compute service manager to determine when and how to execute the job. For example, the compute service manager may divide the job into multiple discrete tasks and may determine what data is needed to execute each of the multiple discrete tasks. The compute service manager may assign each of the multiple discrete tasks to one or more nodes of an execution platform to process the task. The compute service manager 108-1 may determine what data is needed to process a task and further determine which nodes within the execution platform 110-1 are best suited to process the task. Some nodes may have already cached the data needed to process the task and, therefore, be a good candidate for processing the task. Metadata stored in the database 114 assists the compute service manager in determining which nodes in the execution platform have already cached at least a portion of the data needed to process the task. One or more nodes in the execution platform process the task using data cached by the nodes and, if necessary, data retrieved from the storage platform. It is desirable to retrieve as much data as possible from caches within the execution platform because the retrieval speed is typically much faster than retrieving data from the storage platform.

As shown in FIG. 1, the computing environment 100 separates the execution platforms from the storage platforms. In this arrangement, the processing resources and cache resources in the execution platforms operate independently of the data storage devices in the storage platforms. Thus, the computing resources and cache resources are not restricted to specific data storage devices. Instead, all computing resources and all cache resources may retrieve data from, and store data to, any of the data storage resources in the storage platform.

Figure 2:
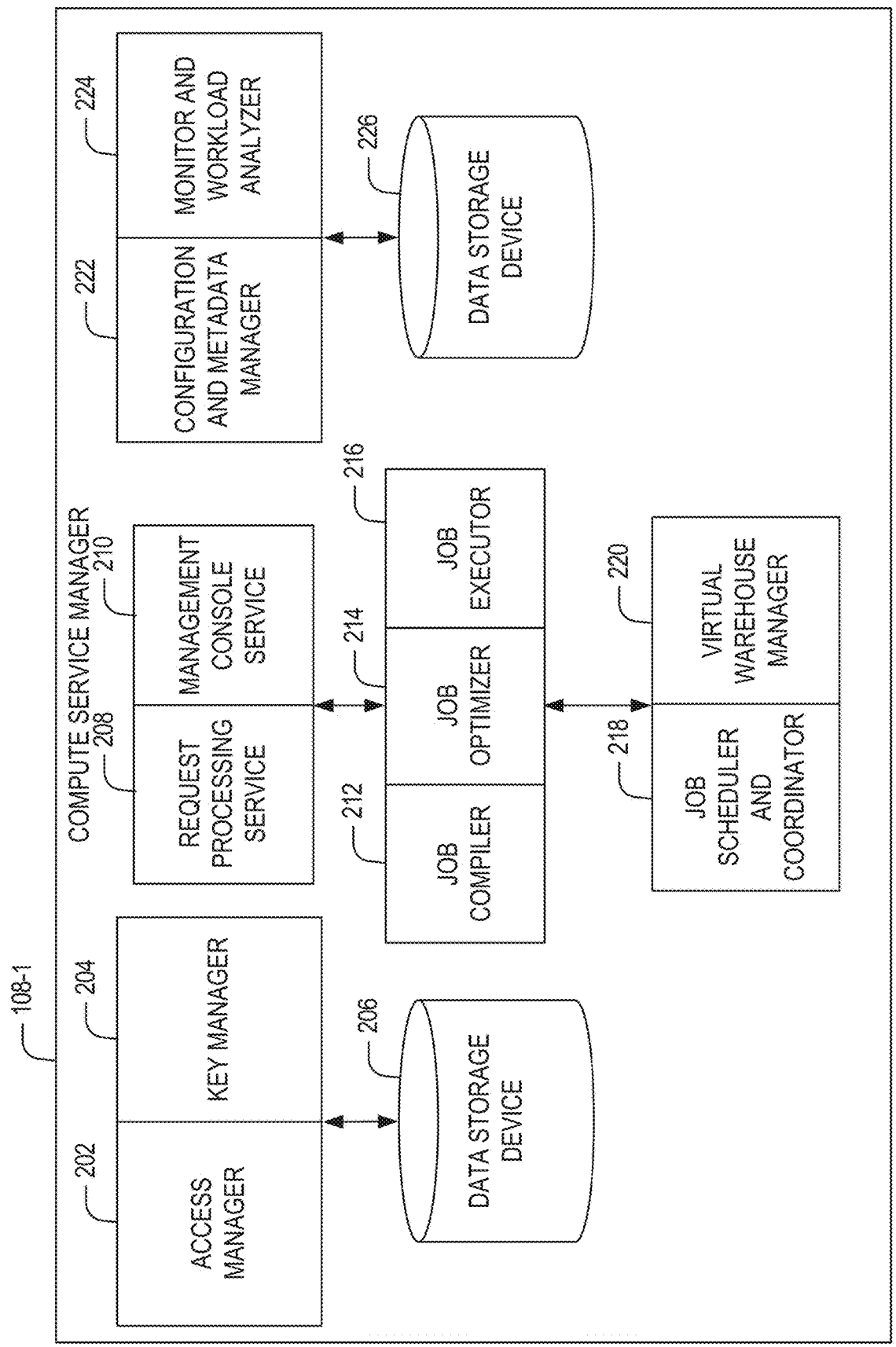
FIG. 2 is a block diagram illustrating components of a compute service manager, in accordance with some embodiments of the present disclosure.

FIG. 2 is a block diagram illustrating components of the compute service manager 108-1, in accordance with some embodiments of the present disclosure. As shown in FIG. 2, the compute service manager 108-1 includes an access manager 202 and a key manager 204 coupled to a data storage device 206. Access manager 202 handles authentication and authorization tasks for the systems described herein. Key manager 204 manages storage and authentication of keys used during authentication and authorization tasks. For example, access manager 202 and key manager 204 manage the keys used to access data stored in remote storage devices (e.g., data storage devices in storage platform 104-1). As used herein, the remote storage devices may also be referred to as "persistent storage devices" or "shared storage devices."

A request processing service 208 manages received data storage requests and data retrieval requests (e.g., jobs to be performed on database data). For example, the request processing service 208 may determine the data necessary to process a received query (e.g., a data storage request or data retrieval request). The data may be stored in a cache within the execution platform 110-1 or in a data storage device in storage platform 104-1.

A management console service 210 supports access to various systems and processes by administrators and other system managers. Additionally, the management console service 210 may receive a request to execute a job and monitor the workload on the system.

The compute service manager 108-1 also includes a job compiler 212, a job optimizer 214 and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 108-1.

A job scheduler and coordinator 218 sends received jobs to the appropriate services or systems for compilation, optimization, and dispatch to the execution platform 110-1. For example, jobs may be prioritized and processed in that prioritized order. In an embodiment, the job scheduler and coordinator 218 determines a priority for internal jobs that are scheduled by the compute service manager 108-1 with other "outside" jobs such as user queries that may be scheduled by other systems in the database but may utilize the same processing resources in the execution platform 110-1. In some embodiments, the job scheduler and coordinator 218 identifies or assigns particular nodes in the execution platform 110-1 to process particular tasks. A virtual warehouse manager 220 manages the operation of multiple virtual warehouses implemented in the execution platform 110-1. As discussed below, each virtual warehouse includes multiple execution nodes that each include a cache and a processor.

Additionally, the compute service manager 108-1 includes a configuration and metadata manager 222, which manages the information related to the data stored in the remote data storage devices and in the local caches (e.g., the caches in execution platform 110-1). The configuration and metadata manager 222 uses the metadata to determine which data micro-partitions need to be accessed to retrieve data for processing a particular task or job. A monitor and workload analyzer 224 oversee processes performed by the compute service manager 108-1 and manages the distribution of tasks (e.g., workload) across the virtual warehouses and execution nodes in the execution platform 110-1. The monitor and workload analyzer 224 also redistribute tasks, as needed, based on changing workloads throughout the network-based database system 102 and may further redistribute tasks based on a user (e.g., "external") query workload that may also be processed by the execution platform 110-1. The configuration and metadata manager 222 and the monitor and workload analyzer 224 are coupled to a data storage device 226. Data storage device 226 in FIG. 2 represent any data storage device within the network-based database system 102. For example, data storage device 226 may represent caches in execution platform 110-1, storage devices in storage platform 104-1, or any other storage device.

In an example, a large source table may be (logically) organized as a set of regions in which each region can be further organized into a set of micro-partitions. Additionally, each micro-partition can be stored as a respective file in the subject system in an embodiment. Thus, the term "file" (or "data file") as mentioned herein can refer to a micro-partition or object for storing data in a storage device or storage platform (e.g., at least one storage platform from storage platforms 104-1 to 104-N). In embodiments herein, each file includes data, which can be further compressed (e.g., using an appropriate data compression algorithm or technique) to reduce a respective size of such a file. For example, as discussed further herein, due to fragmentation, some data corresponding to a set of rows in a given file may be empty or sparsely populated, and compression of such rows can yield a smaller size of the file.

In some instances, fragmentation can occur at a table level where data (e.g., corresponding to a set of rows in a given source table) are stored across different micro-partitions or files associated with a given table. In comparison, when there is no fragmentation (or a low amount of fragmentation), the same set of rows are stored in a same partition or file associated with the table. It is appreciated that even in a source table with low fragmentation (e.g., based on a threshold number of rows), there can be multiple files associated with the table. Consolidated rows may also not be stored in one file, and can be stored in fewer files than where such rows were stored prior to consolidation.

In other examples, over time, modifying data can cause data fragmentation where files (or micro-partitions) are undersized or sparsely populated. As mentioned herein, each partition can correspond to a set of rows in a given source table, and a fragmented partition refers to a particular partition with one or more rows that are empty such that the source table is not as populated with data.

In some embodiments, metadata may be generated when changes are made to one or more source table(s) using a data manipulation language (DML), where such changes can be made by way of a DML statement. Examples of modifying data, using a given DML statement, may include updating, changing, merging, inserting, and deleting data into a source table(s), file(s), or micro-partition(s). Also, when multiple tables are selected from (e.g., as part of a DML statement) into another table, the target table of such a DML statement could suffer from fragmentation.

Although the above discussion and examples are related to compute service manager 108-1, in some embodiments, similar or the same components are included in each of the compute service managers shown in FIG. 1.

Figure 3:
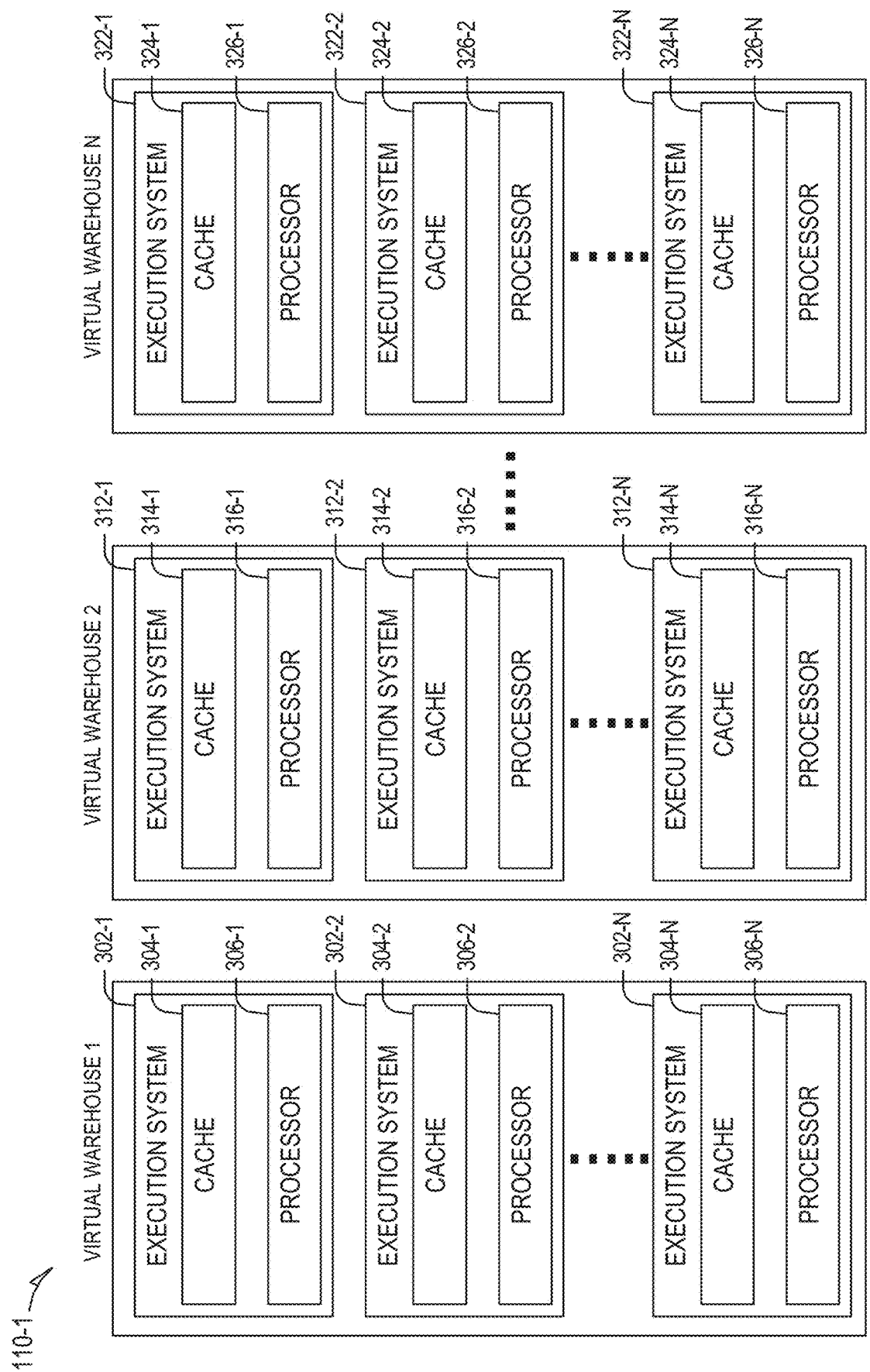
FIG. 3 is a block diagram illustrating components of an execution platform, in accordance with some embodiments of the present disclosure.

FIG. 3 is a block diagram illustrating components of the execution platform 110-1, in accordance with some embodiments of the present disclosure. As shown in FIG. 3, the execution platform 110-1 includes multiple virtual warehouses, including virtual warehouse 1, virtual warehouse 2, and virtual warehouse N. Each virtual warehouse includes multiple execution nodes that each include a data cache and a processor. The virtual warehouses can execute multiple tasks in parallel by using the multiple execution nodes. As discussed herein, the execution platform 110-1 can add new virtual warehouses and drop existing virtual warehouses in real-time based on the current processing needs of the systems and users. This flexibility allows the execution platform 110-1 to quickly deploy large amounts of computing resources when needed without being forced to continue paying for those computing resources when they are no longer needed. All virtual warehouses can access data from any data storage device (e.g., any storage device in storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 106-1 to 106-N shown in FIG. 1. Thus, the virtual warehouses are not necessarily assigned to a specific data storage device 106-1 to 106-N and, instead, can access data from any of the data storage devices 106-1 to 106-N within the storage platform 104. Similarly, each of the execution nodes shown in FIG. 3 can access data from any of the data storage devices 106-1 to 106-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data the execution nodes are caching. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternate embodiments may include execution nodes containing any number of processors and any number of caches. Additionally, the caches may vary in size among the different execution nodes. The caches shown in FIG. 3 store, in the local execution node, data that was retrieved from one or more data storage devices in storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes which is significantly faster and avoids the bottleneck problem discussed above. In some embodiments, the caches are implemented using high-speed memory devices that provide fast access to the cached data. Each cache can store data from any of the storage devices in the storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and n are associated with the same execution platform 110-1, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110-1 is also fault tolerant. For example, if one virtual warehouse fails, that virtual warehouse is quickly replaced with a different virtual warehouse at a different geographic location.

A particular execution platform 110-1 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Although the above discussion and examples are related to execution platform 110-1, in some embodiments, similar or the same components are included in each of the execution platforms shown in FIG. 1.

A set of files (or micro-partitions) to scan in executing a query may be referred to herein as a "scanset".

Some existing systems, including those that support hybrid tables (e.g., key-value tables stored on linearizable storage provided by a distributed database such as FoundationDB), do not support pruning of queries during runtime (e.g., during execution of queries). Advantageously, embodiments described herein can provide improvements to the performance of a hybrid table's join operations by performing pruning operations for key ranges to be scanned at runtime.

More specifically, the subject technology can provide the following advantages:
1. Support is provided for read version pruning which can reduce the number of records that are read even when completely pruning the range may not be possible.
2. Support is provided for the value list probe which will work better if the values in a range bloom vector are small and a bloom filter is applied on a key or indexed column.
3. Support is provided for runtime pruning when the bloom filter is applied on both the primary key and secondary indexed column.

The following discussion relates to a range bloom vector and runtime pruning of FDN table(s). As referred to herein, a FDN table is a table that utilizes micro-partitions for storing data, and a given FDN table may include a set of files (e.g., one or more files).

In an implementation, a range bloom vector refers to a data structure for gathering and querying information on value ranges using only a constant amount of memory. In short, the range bloom vector is a bounded-size hash map (the default is 64 entries), where each entry holds a minimum-maximum value pair which describes a range of values present in the input data set. The ranges of individual hash map entries are disjunct. A specific value in each range is chosen as the key of the hash map entry for purposes of hashing. For any given input value, there is a simple function which maps the input value to exactly one hash key. If there is a range in the range bloom vector which contains the input value, then the range bloom vector's hash map will contain an entry for the respective key, and the range of that entry will encompass the input value.

A join is an operation in query processing that determines rows in two input streams that "match" with respect to some of their attributes. In an embodiment, those attributes are referred to as join keys. Join operations are typically very time-consuming operations during query execution. A known embodiment of a join operation includes a SQL join clause for combining columns from one or more tables in a given database system. The join clause is a mechanism for combining columns from one or more tables by using values common to each of the one or more tables.

In an example, a hash join is an example of a join algorithm that may be used in the implementation of a given database system. Various forms of hash joins are commonly used in database systems to compute the result of a join. Hash joins build one or more multiple hash tables with rows of one of the inputs (typically the smaller input) referred to as the "build side" input. The rows are probed from the other input (typically the larger input) referred to as the "probe side" input and into the hash tables.

In an example, a build operator refers to an operation(s) that builds a hash table as part of a hash operation. Additionally, a probe operator refers to an operation that reads inner streams of data and probes a hash table to find matching rows as part of a hash operation. In an implementation, a bloom filter is a space-efficient probabilistic data structure that is used to test whether an element is a member of a set.

An existing technique is to, for a given join, have the join first consume one full input relation R, hash the attributes a of each input row r in R, and construct a bit vector based on the computed hash values. This bit vector is then pushed down the sub-expression (e.g, sub-tree) that produces S, where it can be used to filter the input before it even reaches the join at the probe operation. In some existing implementations, this technique is referred to as a "bloom filter" or "bloom filters" or "bloom join", also called "bit vectors" in some very early implementations.

For hybrid table(s), pruning the ranges based on the predicates and the EP context can be provided. In an implementation, there are two types of pruning for hybrid tables, range pruning which will prune based on the first key column, and read version pruning which will avoid scanning the records under a read version. Moreover, range pruning can be applied on high-order key columns together with the predicates. In an example, if there is an equal predicate on the first key column, the second key column can be pruned if the second key column is the joining key.

Figure 4:
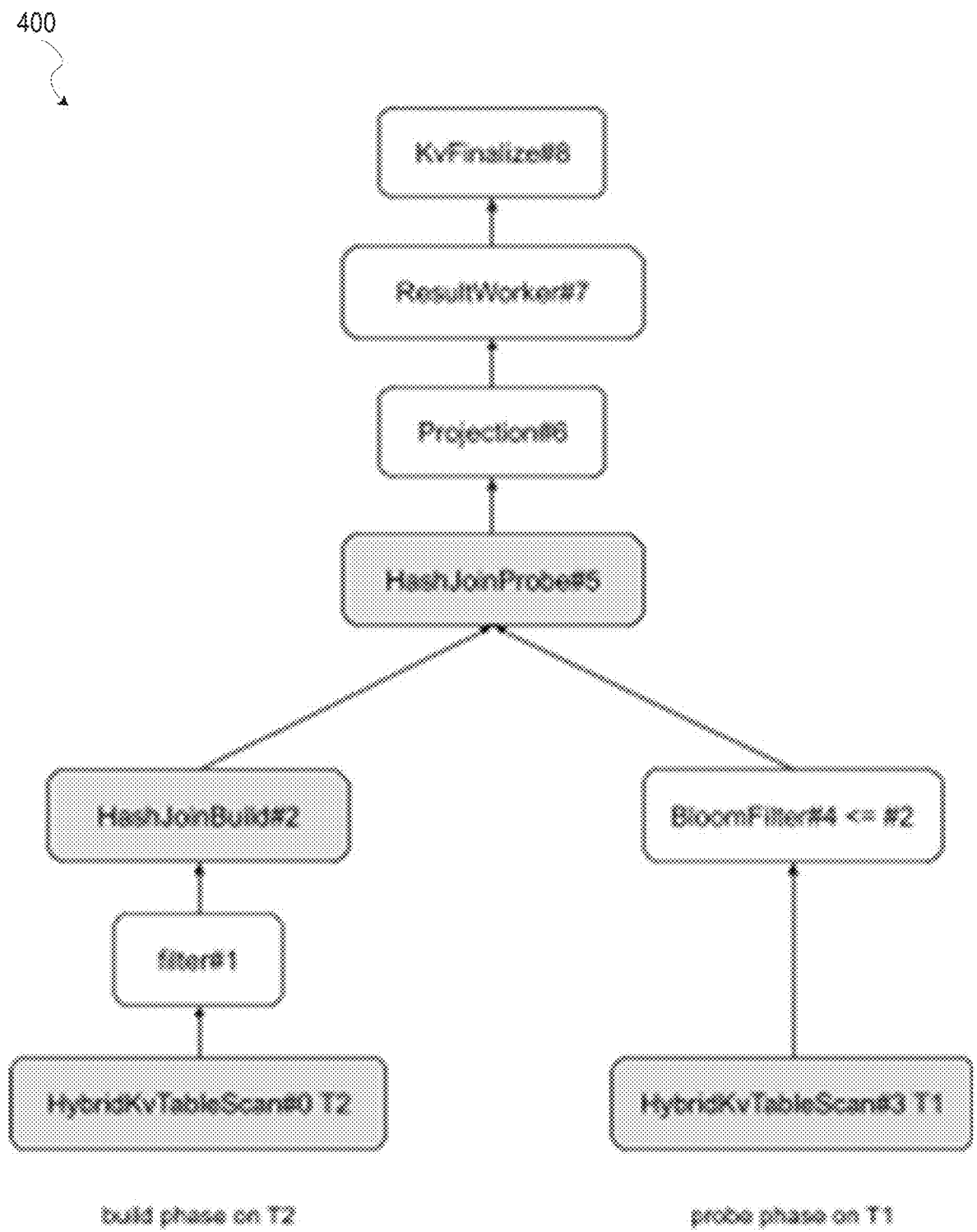
FIG. 4 is a diagram depicting an example of a query plan for a join, in accordance with some embodiments of the present disclosure.

FIG. 4 is a diagram depicting an example of a query plan 400 for a join, in accordance with some embodiments of the present disclosure.

By way of example, for a hash join query for FDN tables (but not hybrid tables as discussed herein), in a build side, a set of build keys are hashed and placed into a bloom filter. The bloom filter can then be used and probed on the consumer side of the joins. During a table scan operation (e.g., operation to scan or read data from a given table), a FDN table (or a given execution node executing a given query on the FDN table) utilizes information saved in a data structure called a range bloom vector during a build phase to prune the FDN files at runtime. By checking the metadata in a FDN file related to minimum and maximum values for the join keys and whether there is an overlap between the FDN file and desired build keys, the execution node (or component executing or processing the query) will decide whether scanning the specific FDN file can be skipped (e.g., not performed).

In an implementation, a range bloom vector is generated during a hash join build phase (e.g., similar to what is provided for the FDN table), and information saved in the range bloom vector (e.g., the minimum and maximum range of the build key) is utilized at runtime during a hybrid table scan.

In an implementation, there can also have two different types of runtime pruning (again not for FDN tables, but for hybrid tables), which are described separately below.

Range pruning (e.g., only applicable for hybrid tables, not FDN tables) is helpful when there is a range bloom vector and the probe keys are in the primary key columns on the probe table. It can be used to reduce the range boundaries to scan or remove the range completely to avoid scanning the records that will be filtered out later.

The following example will be used to describe how the range runtime pruning works. Suppose there are two hybrid tables and a join query that is joining on the first column in the primary key.

Unset
create or replace hybrid table t1 (col1 int, col2 int, col3 int, primary key (col1, col2));
insert into t1 values (0,0,20), (0,2,10), (2,9,8), (4,1, 3), (4,2,4), (5,1,4), (7,5,10), (8,6,10), (9,1,2);
create or replace hybrid table t2 (col1 int, col2 int, primary key (col1, col2));
insert into t2 values (1, 1), (1,2), (2,2), (3,3), (4,4), (5,5), (6,6);
select * from t1 join t2
on t1.col1=t2.col1 and t2.col2<3;

In the example of FIG. 4, a query plan 400 has been generated for the above join statement. Without runtime pruning, the following can be performed (e.g., by an execution node).

1. The query plan will have two hybrid table scans: the scanning on table t2 for the build side, and scanning on table t1 on the probe side.
2. During the scan on table t2 at the build side, the execution node will first scan all the rows and apply the filter t2.col2<3 and fetch the two rows matching the filter which are (1,1), (2,2).
3. The HashJoinBuild #2 operator will build the hash key on the join key which will be used later in the BloomFilter #4.
4. The HybridKvTableScan #3 will execute the hybrid table scan on table t1. Since there is no predicate, a full table scan is performed to fetch all the results. And then bloom filter operator is performed to filter out the results that do not match the hash key.

Figure 5:
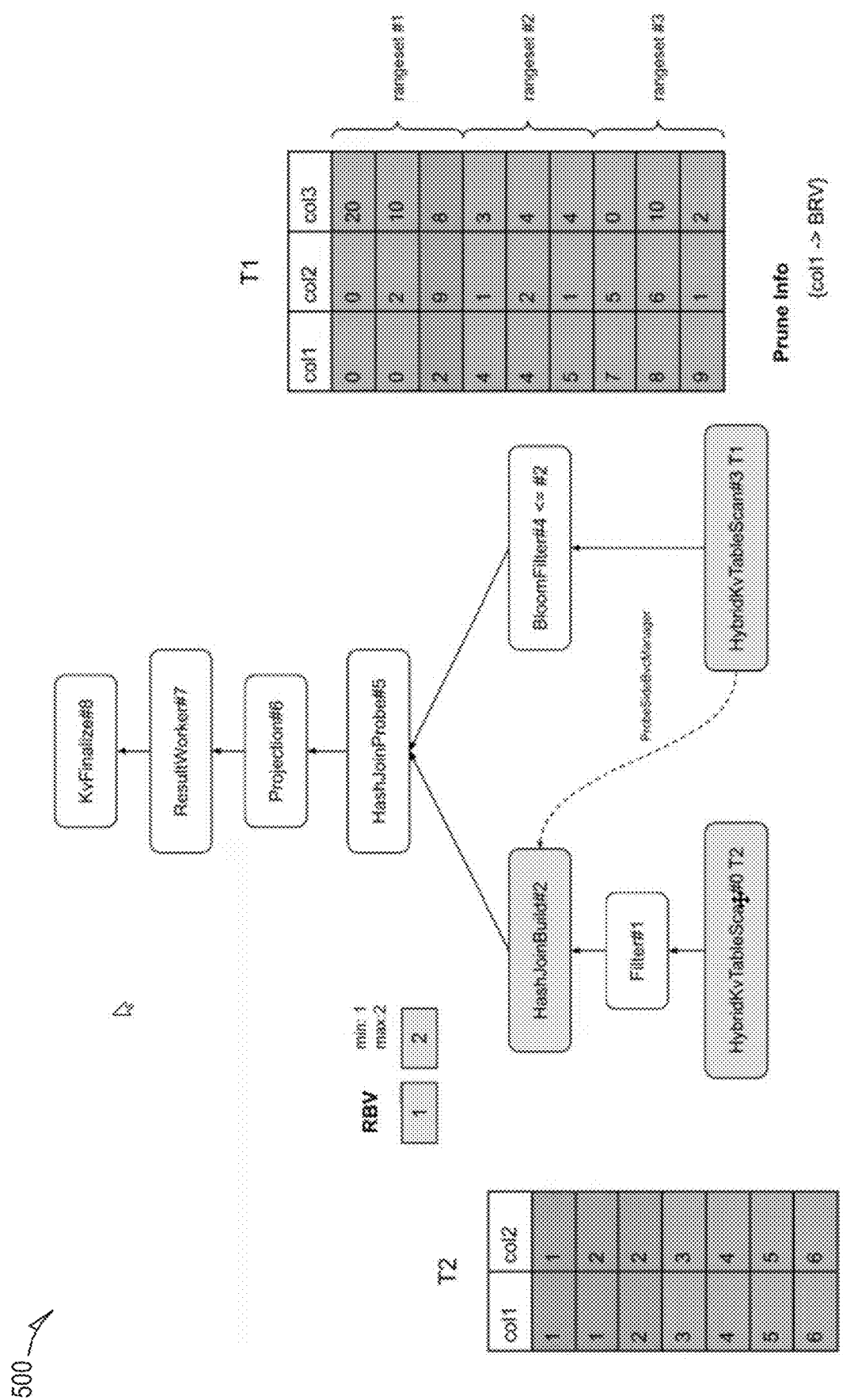
FIG. 5 is a diagram depicting an example of runtime pruning improving read efficiency, in accordance with some embodiments of the present disclosure.

FIG. 5 is a diagram 500 depicting an example of runtime pruning improving read efficiency, in accordance with some embodiments of the present disclosure.

During the HashJoinBuild #2, a range bloom vector (RBV) is generated which includes a vector of the key ranges for the build keys, containing value 1 and 2 in this case. The RBV will be used later during the table scan on the build side for scanning on table t1.

In the example of FIG. 5, an important change involves the table scan at the probe phase HybridKvTableScan #3. First at compilation time, the HybridKvTableScan RSO (rowset operator) is extended to include a prune structure saving the RSO ID (#2 in the above case) of the HashJoinBuild RSO and the join key column id (col1 id). Using this information, the generated RBV in the HashJoinBuild #2 is fetched using ProbeSideBvcManager and a prune information structure is generated that includes the mapping between the column and the RBV structure. Using the prune information, it can be determined that the join and build key is on col1 and the minimum and maximum of col1 is [1, 2] in the build keys.

During the execution of the HybridKvTableScan (e.g., hybrid key value table scan operation), the prune information can be applied to eliminate ranges from being scanned and to reduce (trim) a range for the scanning. By using the prune information, it can be determined that col1's value is between [1, 2]. Since the hybrid table scanning is executed based on a rangeset (range set), scanning on rangeset #2 and #3 can be completely avoided. The range to scan on rangeset #1 can be reduced by using [1, 2] instead of the whole range in rangeset #1. As mentioned herein, a rangeset or range set refers to a set of rows of a table within a particular range (e.g., a set of consecutive rows within a table). In the example of FIG. 5, table T1 includes three respective rangesets in which each rangeset corresponds to a particular set of (consecutive) rows including values for columns corresponding to col1, col2, and col3.

FIG. 6 is a diagram 600 depicting an example of runtime read version pruning, in accordance with some embodiments of the present disclosure.

If the build key is not part of the key, runtime range pruning may not be applied but other pruning can be performed based on EP information which contains the column metadata. In an implementation, as EPs are computed during the table compaction, such EPs may not contain the most up-to-date and accurate information about the column metadata. Thus, the minimum and maximum value for the column values could be stale and can only be valid for the given read version during the EP generation. Such values could not be directly used for the runtime range pruning to reduce the range, but these values could be used for the read version pruning if the prune information is also applied.

Using the above tables, this time the join query is t1.col3 on t2.col1 in the following example. Also, a compaction has occurred before which computes the EPs, and there is a new insertion after the EP was computed which inserted a row in T1.

Unset
    alter table t2 compact hybrid table; —compute the EP
    insert into t2 values (1,2,2);
    select * from t1 join t2
      on t1.col3=t2.col1 and t2.col2<3.

During the hybrid table scan on table t2 (HybridKvTableScan #0) and the hash join build phase (HashJoinBuild #2), the same can be performed with range pruning by filtering out the rows in t2 and build the RBV with value 1 and 2.

The following discussion relates to an example involving table data and EP data shown in FIG. 6.

Figure 7:
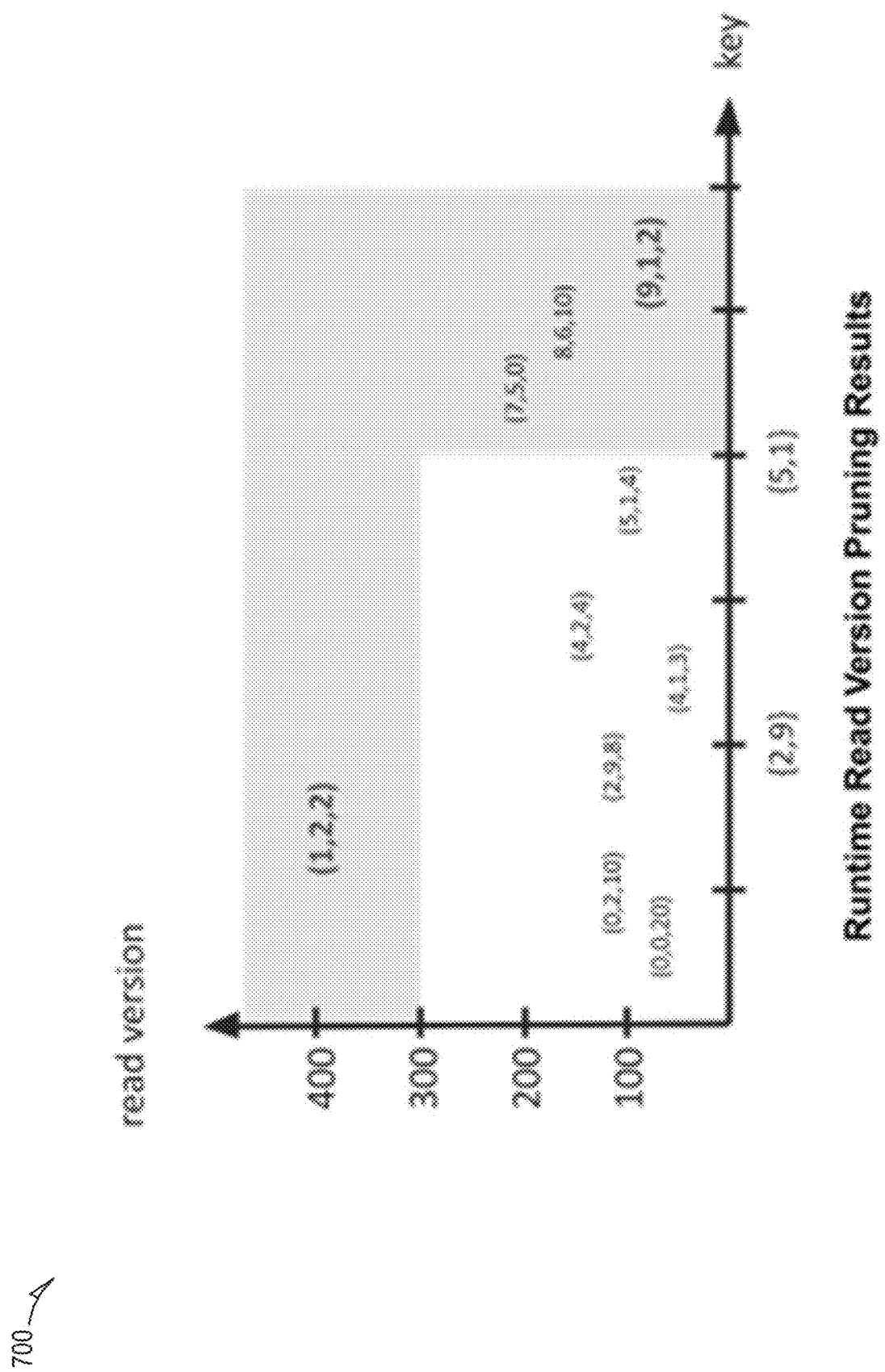
FIG. 7 is a diagram depicting an example of runtime read version pruning results, in accordance with some embodiments of the present disclosure.

FIG. 7 is a diagram 700 depicting an example of runtime read version pruning results, in accordance with some embodiments of the present disclosure.

In this example, the EP already computed on table t1 shown in FIG. 6 is used, and three key ranges are populated with each range containing three records. Also each key range includes two binary values of the range boundary, which presents the start and end boundary of the range. The range boundary is generated during the table compaction and is essentially the FDB key containing the table prefix and the serialized key columns. For simplicity, the column values like {2, 9}, {4, 1} are used to represent the range boundaries.

It can be determined that the desired range for t1.col3 is [0, 2] from the RBV. Given the fact that the join key is on t1.col3, any range pruning is not performed so all three key ranges are processed.

The minimum and maximum value associated with a read version in the EP for column col3 can also be determined. For example, in the first key range, it can be determined that at version 300, the col3's value is between 8 and 20, but it is possible that there are other values after 400 (say another insert on t1 with values (2,8,1) happened after the last table compaction). Given that the range in the RBV is [1, 2], a check can be performed if there is an overlap between the range in the RBV and the range in the EP. If there is no overlap, it is guaranteed that there are no matching records under the read version. Thus, scanning using the version after the read version in the given range set can be performed. In the above case, the first and second range set includes the col3 value for [8,20] and [3,4] at version 300, so scanning beyond these versions can be performed. Performing the scan using the read version 300 causes skipping scanning the existing rows below version 300.

Figure 8:
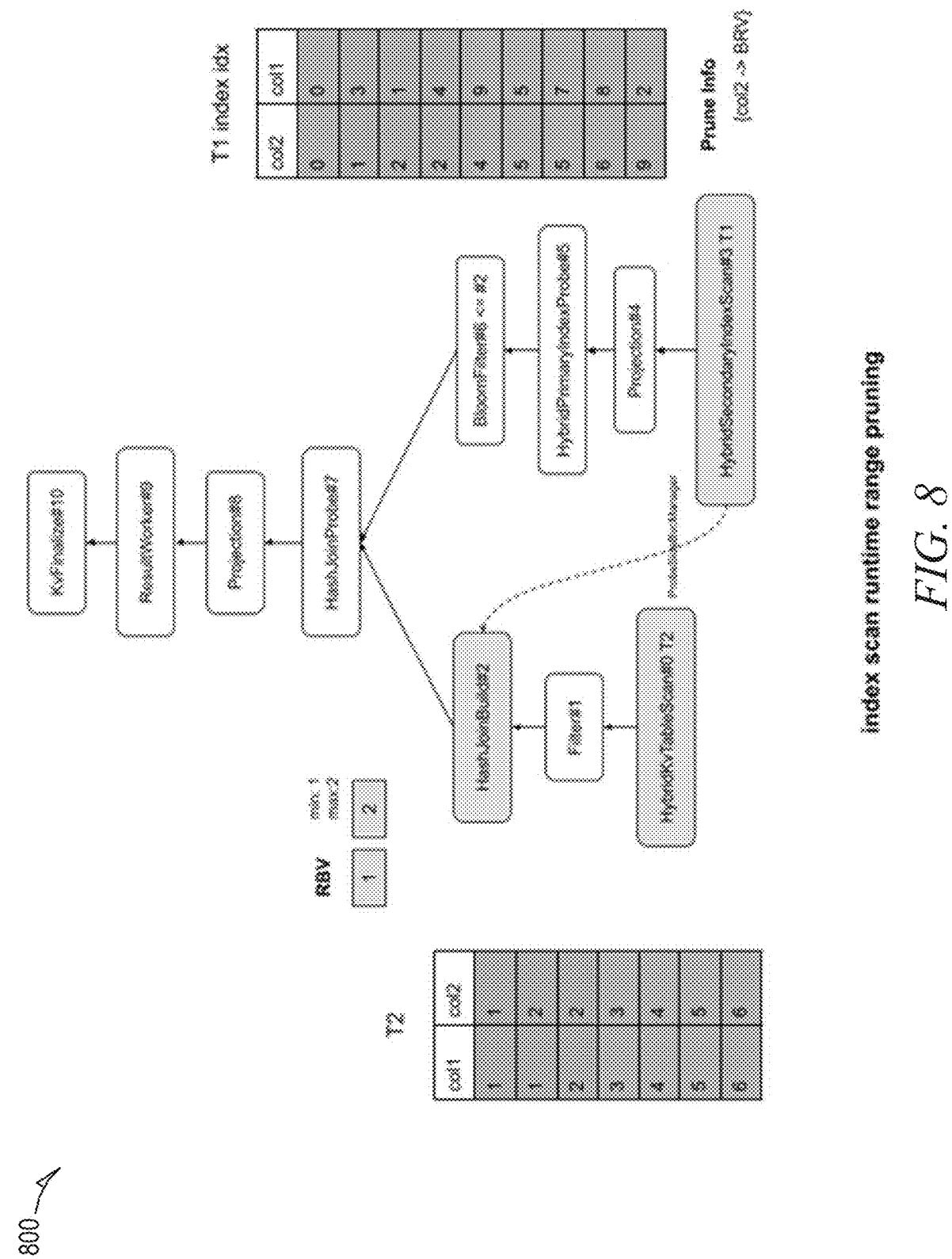
FIG. 8 is a diagram depicting an example of hybrid table runtime range pruning, in accordance with some embodiments of the present disclosure.

FIG. 8 is a diagram 800 depicting an example of hybrid table runtime range pruning, in accordance with some embodiments of the present disclosure.

Although the primary key is used as an example discussed above, it is understood that a same pruning implementation could apply to the hybrid table secondary index scan. Specifically, if the probe key is part of the secondary index columns, and the probe side scanning is a HybridSecondaryIndexScan, the runtime range pruning on the index columns can be applied.

In order to support the runtime read version pruning on the index scan, the EP build on the secondary indexes is needed. After providing the same EP compute and build on the indexes, runtime read version pruning can be provided. Even without the EP on the secondary index, runtime range pruning can be performed to reduce the key ranges.

Below are example statements that undergo runtime range pruning on secondary indexes, which is further illustrated in FIG. 8.

Figure 9:
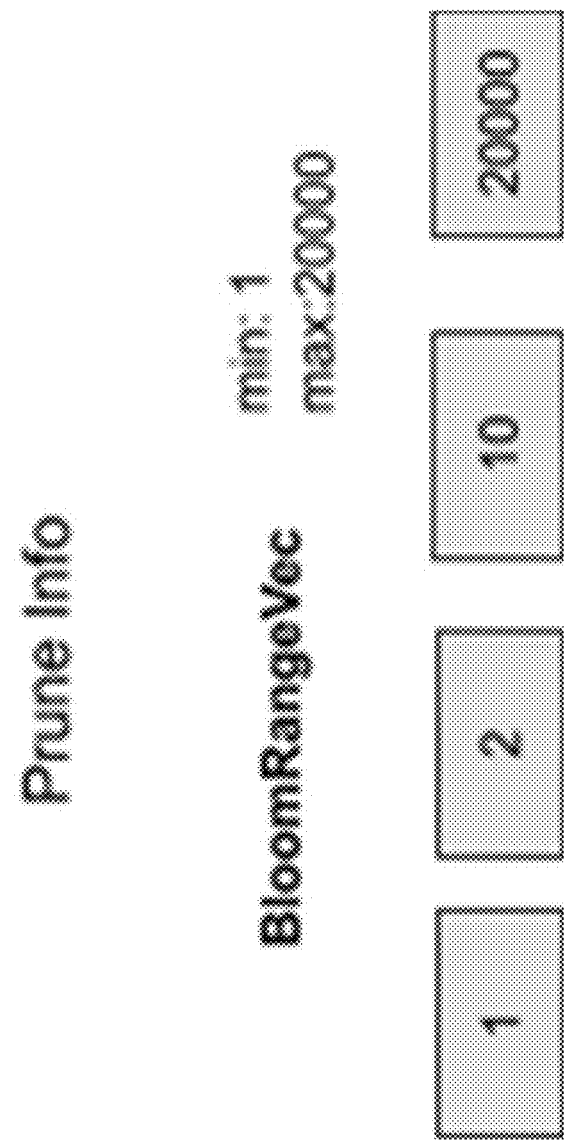
FIG. 9 is a diagram depicting an example of prune values probing, in accordance with some embodiments of the present disclosure.

Unset
    create or replace hybrid table t1 (col1 int primary key, col2 int, col3 int, index idx (col2)); insert into t1 values (0,0,20), (1,2,10), (2,9,8), (3,1,3), (4,2,4), (5,5,4), (7,5, 10), (8,6,10), (9,4,2);
    create or replace hybrid table t2 (col1 int, col2 int, primary key (col1, col2)); insert into t2 values (1,1), (1,2), (2,2), (3,3), (4,4), (5,5), (6,6);
    select * from t1 join t2 on t1.col2=t2.col1 and t2.col2<3 and t1.col2 between 1 and 20;

FIG. 9 is a diagram 900 depicting an example of prune values probing, in accordance with some embodiments of the present disclosure.

In the above runtime range scanning examples, only the minimum and maximum value in the RBV are fetched and then used as the boundaries for the scanning. When the build keys in the RBV are sparse such that the keys are spread across a large range but with a small number of values, using just the minimum and maximum could end up scanning a large range. In the example illustrated in FIG. 9, the range of the keys in RBV is in [1, 20000] but it actually only contains 4 values in this range.

The RBV implementation can be extended and an API is introduced to get a list of the keys in RBV. Using the list of these keys, these values are converted into a list of equal predicates instead of minimum/maximum range predicates. In this example, using a small number of equal predicates can be better performant than scanning with a very wide range.

Figure 10:
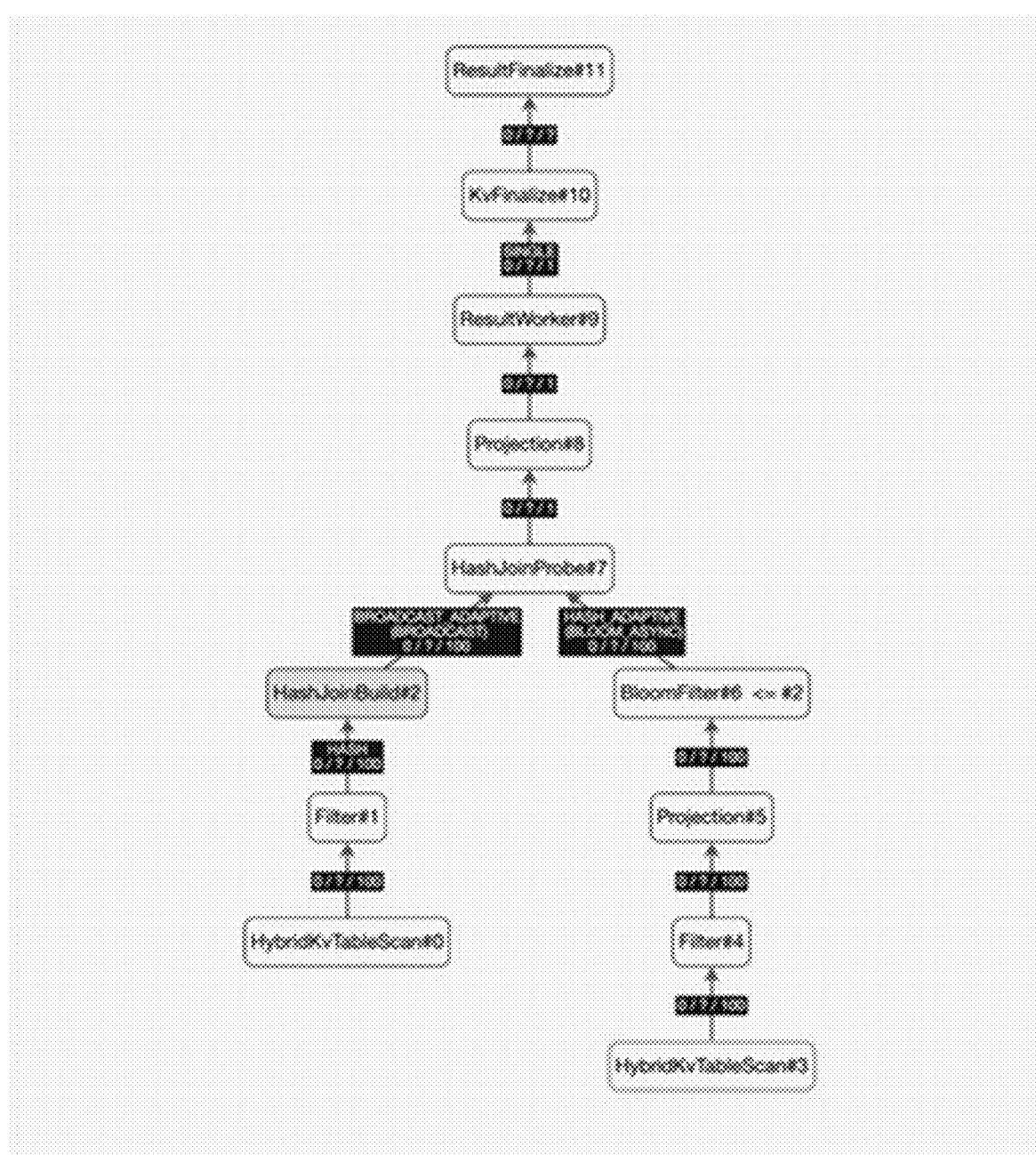
FIG. 10 is a diagram depicting an example of an optimization to skip the table scanning, in accordance with some embodiments of the present disclosure.

FIG. 10 is a diagram 1000 depicting an example of an optimization to skip the table scanning, in accordance with some embodiments of the present disclosure.

A table scan can completely be avoided (e.g., forgo from being performed) on the probe side table, if the build key together with the predicate could produce nothing. This optimization can be applied during the build phase and before applying on the prune information.

Figure 11:
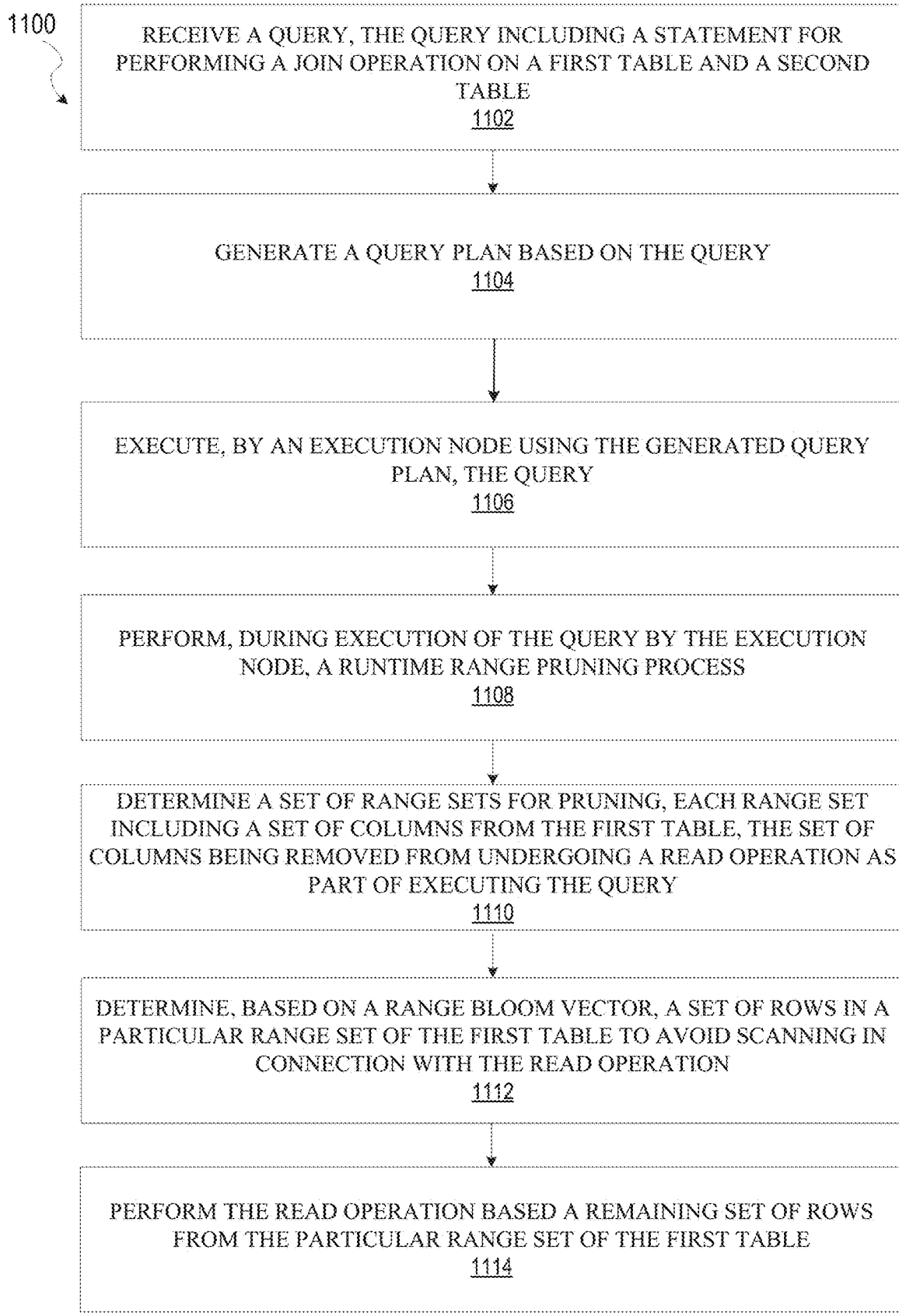
FIG. 11 is a flow diagram illustrating operations of a database system in performing a method, in accordance with some embodiments of the present disclosure.

Unset
    create or replace hybrid table t1 (col1 string, col2 string, primary key (col1, col2)); insert into t1 values ('a', 'a'), ('a', 'b'), ('c', 'a');
    create or replace hybrid table t2 (col1 string, col2 string, primary key (col1, col2));
    insert into t2 values ('b', 'b');
    select * from t1 join t2 on t1.col2=t2.col2 where t1.col1='a' and t1.col2>'b';

FIG. 11 is a flow diagram illustrating operations of a database system in performing a method, in accordance with some embodiments of the present disclosure. The method 1100 may be embodied in computer-readable instructions for execution by one or more hardware components (e.g., one or more processors) such that the operations of the method 1100 may be performed by components of network-based database system 102. Accordingly, the method 1100 is described below, by way of example with reference thereto. However, it shall be appreciated that method 1100 may be deployed on various other hardware configurations and is not intended to be limited to deployment within the network-based database system 102.

At operation 1102, compute service manager 108-1 receives a query, the query including a statement for performing a join operation on a first table and a second table.

At operation 1104, compute service manager 108-1 generates a query plan based on the query.

At operation 1106, execution node 302-1 executes, using the generated query plan, the query.

At operation 1108, execution node 302-1 performs, during execution of the query by the execution node, a runtime range pruning process.

At operation 1110, execution node 302-1 determines a set of range sets for pruning, each range set including a set of columns from the first table, the set of columns being removed from undergoing a read operation as part of executing the query.

At operation 1112, execution node 302-1 determines, based on a range bloom vector, a set of rows in a particular range set of the first table to avoid scanning in connection with the read operation.

At operation 1114, execution node 302-1 performs the read operation based a remaining set of rows from the particular range set of the first table.

In an embodiment, the range bloom vector comprises vector of key ranges, the vector of key ranges indicating a minimum value and a maximum value of a particular set of values for scanning as part of executing the query.

In an embodiment, a further operation includes: generating, during a compilation process of the query, a prune data structure, the prune data structure comprising information indicating a first identifier of a hash join build operator and a join key column identifier.

In an embodiment, a further operation includes: based on the first identifier and the join key column identifier, generating a prune information data structure including a mapping between a column corresponding to the join key column identifier and the range bloom vector.

In an embodiment, the query plan comprises a first set of nodes and a second set of nodes, the first set of nodes comprises a build side of a hash join, and the second set of nodes comprises a probe side of the hash join.

In an embodiment, the first set of nodes includes a first node corresponding to a key value table scan operation, a second node corresponding to a filter operation, and a third node corresponding to a hash join build operation.

In an embodiment, the second set of nodes includes a first node corresponding to a key value table scan operation, and a second node corresponding to a bloom filter operation.

In an embodiment, the key value table scan operation accesses the range bloom vector provided by a hash join build operation from the first set of nodes.

In an embodiment, a further operation includes: receiving a second query, the second query including a second statement for performing a second join operation on the first table and the second table; generating a second query plan based on the second query; and executing, by the execution node using the generated second query plan, the second query, the executing comprising: performing, during execution of the second query by the execution node, a runtime read version pruning process.

In an embodiment, a further operation includes: generating, during a compaction process of the second table, a set of expression properties for a set of columns of the second table, the set of expression properties include metadata related to the set of columns of the second table; and performing, after generating the set of expression properties, an insert operation of a set of values into the second table.

Figure 12:
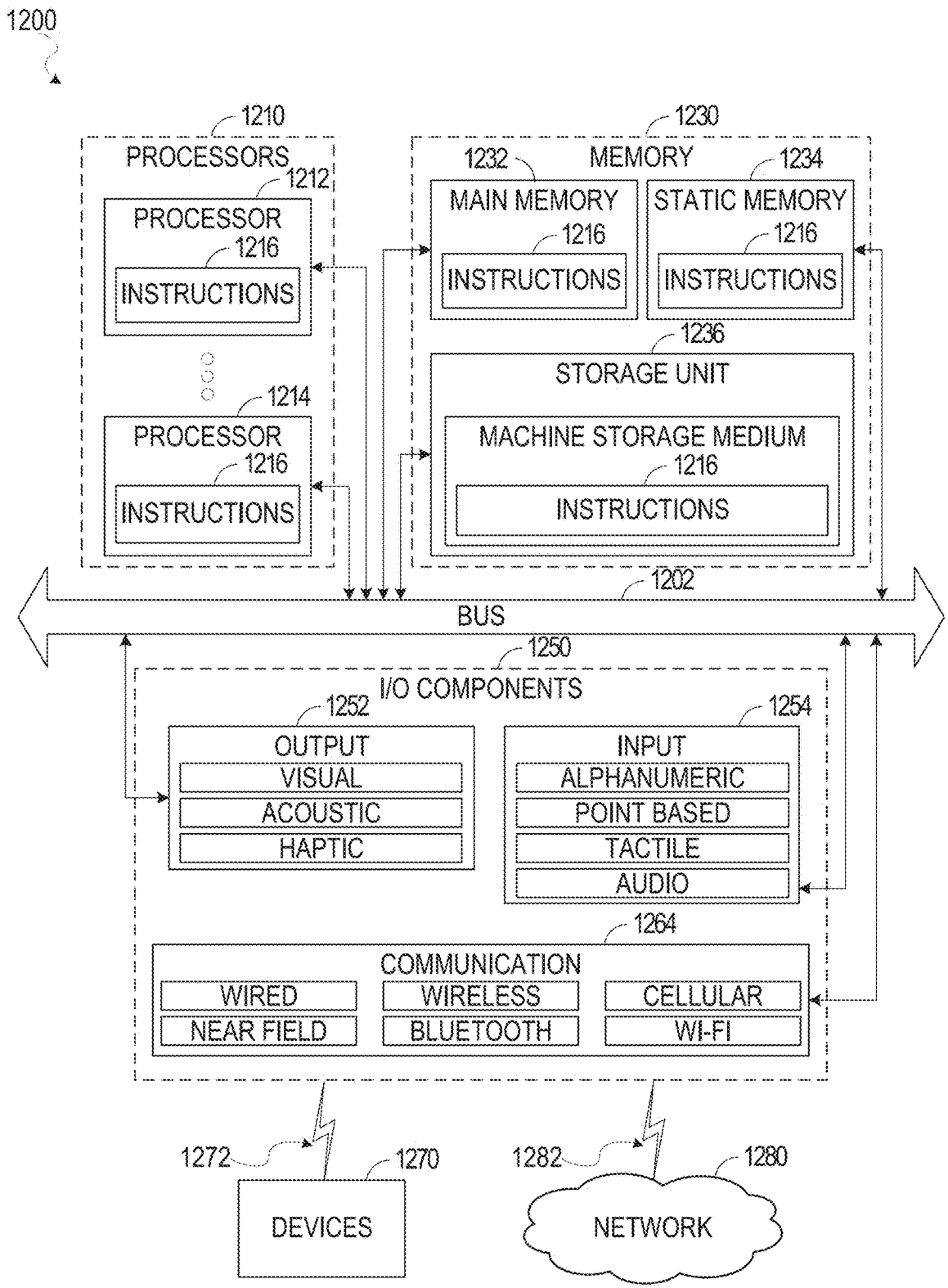
FIG. 12 illustrates a diagrammatic representation of a machine in the form of a computer system within which a set of instructions may be executed for causing the machine to perform any one or more of the methodologies discussed herein, in accordance with some embodiments of the present disclosure.

FIG. 12 illustrates a diagrammatic representation of a machine 1200 in the form of a computer system within which a set of instructions may be executed for causing the machine 1200 to perform any one or more of the methodologies discussed herein, according to an example embodiment. Specifically, FIG. 12 shows a diagrammatic representation of the machine 1200 in the example form of a computer system, within which instructions 1216 (e.g., software, a program, an application, an applet, an app, or other executable code) for causing the machine 1200 to perform any one or more of the methodologies discussed herein may be executed. For example, the instructions 1216 may cause the machine 1200 to execute any one or more operations of any one or more of the methods described above. As another example, the instructions 1216 may cause the machine 1200 to implement portions of the functionality illustrated in any one or more of the previously mentioned figures discussed above. In this way, the instructions 1216 transform a general, non-programmed machine into a particular machine 1200 (e.g., the compute service manager 108-1, the execution platform 110-1, and the user device 112) that is specially configured to carry out any one of the described and illustrated functions in the manner described herein.

In alternative embodiments, the machine 1200 operates as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 1216, sequentially or otherwise, that specify actions to be taken by the machine 1200. Further, while only a single machine 1200 is illustrated, the term "machine" shall also be taken to include a collection of machines 1200 that individually or jointly execute the instructions 1216 to perform any one or more of the methodologies discussed herein.

The machine 1200 includes processors 1210, memory 1230, and input/output (I/O) components 1250 configured to communicate with each other such as via a bus 1202. In an example embodiment, the processors 1210 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1212 and a processor 1214 that may execute the instructions 1216. The term "processor" is intended to include multi-core processors 1210 that may comprise two or more independent processors (sometimes referred to as "cores") that may execute instructions 1216 contemporaneously. Although FIG. 12 shows multiple processors 1210, the machine 1200 may include a single processor with a single core, a single processor with multiple cores (e.g., a multi-core processor), multiple processors with a single core, multiple processors with multiple cores, or any combination thereof.

The memory 1230 may include a main memory 1232, a static memory 1234, and a storage unit 1236, all accessible to the processors 1210 such as via the bus 1202. The main memory 1232, the static memory 1234, and the storage unit 1236 store the instructions 1216 embodying any one or more of the methodologies or functions described herein. The instructions 1216 may also reside, completely or partially, within the main memory 1232, within the static memory 1234, within the storage unit 1236, within at least one of the processors 1210 (e.g., within the processor's cache memory), or any suitable combination thereof, during execution thereof by the machine 1200.

The I/O components 1250 include components to receive input, provide output, produce output, transmit information, exchange information, capture measurements, and so on. The specific I/O components 1250 that are included in a particular machine 1200 will depend on the type of machine. For example, portable machines such as mobile phones will likely include a touch input device or other such input mechanisms, while a headless server machine will likely not include such a touch input device. It will be appreciated that the I/O components 1250 may include many other components that are not shown in FIG. 12. The I/O components 1250 are grouped according to functionality merely for simplifying the following discussion and the grouping is in no way limiting. In various example embodiments, the I/O components 1250 may include output components 1252 and input components 1254. The output components 1252 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 1254 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 1250 may include communication components 1264 operable to couple the machine 1200 to a network 1280 or devices 1270 via a coupling 1282 and a coupling 1272, respectively. For example, the communication components 1264 may include a network interface component or another suitable device to interface with the network 1280. In further examples, the communication components 1264 may include wired communication components, wireless communication components, cellular communication components, and other communication components to provide communication via other modalities. The devices 1270 may be another machine or any of a wide variety of peripheral devices (e.g., a peripheral device coupled via a universal serial bus (USB)). For example, as noted above, the machine 1200 may correspond to any one of the compute service manager 108-1, the execution platform 110, and the devices 1270 may include the user device 112 or any other computing device described herein as being in communication with the network-based database system 102 or the storage platform 104.

Executable Instructions and Machine Storage Medium

The various memories (e.g., 1230, 1232, 1234, and/or memory of the processor(s) 1210 and/or the storage unit 1236) may store one or more sets of instructions 1216 and data structures (e.g., software) embodying or utilized by any one or more of the methodologies or functions described herein. These instructions 1216, when executed by the processor(s) 1210, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 1280 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1280 or a portion of the network 1280 may include a wireless or cellular network, and the coupling 1282 may be a Code Division Multiple Access (CDMA) connection, a Global System for Mobile communications (GSM) connection, or another type of cellular or wireless coupling. In this example, the coupling 1282 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1216 may be transmitted or received over the network 1280 using a transmission medium via a network interface device (e.g., a network interface component included in the communication components 1264) and utilizing any one of a number of well-known transfer protocols (e.g., hypertext transfer protocol (HTTP)). Similarly, the instructions 1216 may be transmitted or received using a transmission medium via the coupling 1272 (e.g., a peer-to-peer coupling) to the devices 1270. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1216 for execution by the machine 1200, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the methods described herein may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments.

Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

The invention claimed is:

1. A network-based database system comprising:
   at least one hardware processor; and
   a memory storing instructions that cause the at least one hardware processor to perform operations comprising:
   generating, during a compaction process of a particular table, a set of expression properties for a set of columns of the particular table, the set of expression properties include metadata related to the set of columns of the particular table;
   performing, after generating the set of expression properties, an insert operation of a set of values into the particular table;
   generating a query plan based on a query, the query plan comprising a first set of nodes and a second set of nodes, the first set of nodes comprising a build side of a hash join, and the second set of nodes comprises a probe side of the hash join, the second set of nodes including a first node corresponding to a key value table scan operation, and a second node corresponding to a bloom filter operation;
   executing, by an execution node using the generated query plan, the query, the executing comprising:
   performing, during execution of the query by the execution node, a runtime range pruning process, the runtime range pruning process comprising:
   determining a set of range sets for pruning, each range set including a set of columns from a first table, the set of columns being removed from undergoing a read operation as part of executing the query;
   determining, based on a range bloom vector, a set of rows in a particular range set of the first table to avoid scanning in connection with the read operation; and
   performing the read operation based a remaining set of rows from the particular range set of the first table.

2. The system of claim 1, wherein the range bloom vector comprises vector of key ranges, the vector of key ranges indicating a minimum value and a maximum value of a particular set of values for scanning as part of executing the query.

3. The system of claim 1, wherein the vector of key ranges comprises two binary values of a range boundary.

4. The system of claim 3, wherein the range boundary is determined during the compaction process.

5. The system of claim 3, wherein the range boundary comprises a key including a table prefix and a set of serialized key columns.

6. The system of claim 1, wherein the operations further comprise:
generating, during a compilation process of the query, a prune data structure, the prune data structure comprising information indicating a first identifier of a hash join build operator and a join key column identifier.

7. The system of claim 6, wherein the operations further comprise:
based on the first identifier and the join key column identifier, generating a prune information data structure including a mapping between a column corresponding to the join key column identifier and the range bloom vector.

8. The system of claim 1, wherein the first set of nodes includes a first node corresponding to a key value table scan operation, a second node corresponding to a filter operation, and a third node corresponding to a hash join build operation.

9. The system of claim 1, wherein the key value table scan operation accesses the range bloom vector provided by a hash join build operation from the first set of nodes.

10. The system of claim 1, wherein the operations further comprise:
receiving a second query, the second query including a second statement for performing a second join operation on the first table and a second table;
generating a second query plan based on the second query; and
executing, by the execution node using the generated second query plan, the second query, the executing comprising:
performing, during execution of the second query by the execution node, a runtime read version pruning process.

11. A method comprising:
generating, during a compaction process of a particular table, a set of expression properties for a set of columns of the particular table, the set of expression properties include metadata related to the set of columns of the particular table;
performing, after generating the set of expression properties, an insert operation of a set of values into the particular table;
generating a query plan based on a query, the query plan comprising a first set of nodes and a second set of nodes, the first set of nodes comprising a build side of a hash join, and the second set of nodes comprises a probe side of the hash join, the second set of nodes including a first node corresponding to a key value table scan operation, and a second node corresponding to a bloom filter operation;
executing, by an execution node using the generated query plan, the query, the executing comprising:
performing, during execution of the query by the execution node, a runtime range pruning process, the runtime range pruning process comprising:
determining a set of range sets for pruning, each range set including a set of columns from a first table, the set of columns being removed from undergoing a read operation as part of executing the query;
determining, based on a range bloom vector, a set of rows in a particular range set of the first table to avoid scanning in connection with the read operation; and
performing the read operation based a remaining set of rows from the particular range set of the first table.

12. The method of claim 11, wherein the range bloom vector comprises vector of key ranges, the vector of key ranges indicating a minimum value and a maximum value of a particular set of values for scanning as part of executing the query.

13. The method of claim 11, wherein the vector of key ranges comprises two binary values of a range boundary.

14. The method of claim 13, wherein the range boundary is determined during the compaction process.

15. The method of claim 13, wherein the range boundary comprises a key including a table prefix and a set of serialized key columns.

16. The method of claim 11, further comprising:
generating, during a compilation process of the query, a prune data structure, the prune data structure comprising information indicating a first identifier of a hash join build operator and a join key column identifier.

17. The method of claim 16, further comprising:
based on the first identifier and the join key column identifier, generating a prune information data structure including a mapping between a column corresponding to the join key column identifier and the range bloom vector.

18. The method of claim 11, wherein the first set of nodes includes a first node corresponding to a key value table scan operation, a second node corresponding to a filter operation, and a third node corresponding to a hash join build operation.

19. The method of claim 11, wherein the key value table scan operation accesses the range bloom vector provided by a hash join build operation from the first set of nodes.

20. A non-transitory computer-storage medium comprising instructions that, when executed by one or more processors of a machine, configure the machine to perform operations comprising:
generating, during a compaction process of a particular table, a set of expression properties for a set of columns of the particular table, the set of expression properties include metadata related to the set of columns of the particular table;
performing, after generating the set of expression properties, an insert operation of a set of values into the particular table;
generating a query plan based on a query, the query plan comprising a first set of nodes and a second set of nodes, the first set of nodes comprising a build side of a hash join, and the second set of nodes comprises a probe side of the hash join, the second set of nodes including a first node corresponding to a key value table scan operation, and a second node corresponding to a bloom filter operation;
executing, by an execution node using the generated query plan, the query, the executing comprising:
performing, during execution of the query by the execution node, a runtime range pruning process, the runtime range pruning process comprising:
determining a set of range sets for pruning, each range set including a set of columns from a first table, the set of columns being removed from undergoing a read operation as part of executing the query;

determining, based on a range bloom vector, a set of rows in a particular range set of the first table to avoid scanning in connection with the read operation; and performing the read operation based a remaining set of rows from the particular range set of the first table.

* * * * *